US008975885B2

(12) United States Patent
Philbrick et al.

(10) Patent No.: US 8,975,885 B2
(45) Date of Patent: Mar. 10, 2015

(54) SYSTEM AND METHOD FOR IMPROVING REGULATION ACCURACY OF SWITCH MODE REGULATOR DURING DCM

(75) Inventors: Rhys S. A. Philbrick, Cary, NC (US); Steven P. Laur, Raleigh, NC (US)

(73) Assignee: Intersil Americas Inc., Milpitas, CA (US)

( * ) Notice: Subject to any disclaimer, the term of this patent is extended or adjusted under 35 U.S.C. 154(b) by 765 days.

(21) Appl. No.: 13/098,880

(22) Filed: May 2, 2011

(65) Prior Publication Data

US 2012/0212204 A1 Aug. 23, 2012

Related U.S. Application Data

(60) Provisional application No. 61/444,222, filed on Feb. 18, 2011, provisional application No. 61/454,050, filed on Mar. 18, 2011.

(51) Int. Cl.
*G05F 1/56* (2006.01)
*H02M 3/156* (2006.01)
*H02M 1/00* (2006.01)

(52) U.S. Cl.
CPC ...... *H02M 3/156* (2013.01); *H02M 2001/0003* (2013.01); *H02M 2001/0032* (2013.01); *Y02B 70/16* (2013.01)
USPC ............................. 323/284; 323/285; 323/224

(58) Field of Classification Search
USPC ......... 323/224, 282–286, 288, 299, 300, 271, 323/287
See application file for complete search history.

(56) References Cited

U.S. PATENT DOCUMENTS

| | | | | |
|---|---|---|---|---|
| 5,414,613 | A * | 5/1995 | Chen | 363/52 |
| 5,548,206 | A * | 8/1996 | Soo | 323/284 |
| 6,229,292 | B1 * | 5/2001 | Redl et al. | 323/285 |
| 6,366,070 | B1 * | 4/2002 | Cooke et al. | 323/284 |
| 6,728,117 | B2 * | 4/2004 | Schemmann et al. | 363/21.12 |
| 7,719,251 | B2 * | 5/2010 | Qahouq et al. | 323/286 |
| 7,791,324 | B2 * | 9/2010 | Mehas et al. | 323/283 |
| 8,085,011 | B1 * | 12/2011 | Petricek | 323/259 |
| 8,125,798 | B2 * | 2/2012 | Huynh et al. | 363/21.12 |
| 8,541,993 | B2 * | 9/2013 | Notman et al. | 323/271 |
| 2004/0032242 | A1 * | 2/2004 | Corva et al. | 323/284 |
| 2004/0196014 | A1 | 10/2004 | Chapuis | |
| 2005/0017703 | A1 * | 1/2005 | Walters et al. | 323/288 |
| 2008/0088289 | A1 | 4/2008 | Fogg et al. | |
| 2008/0284398 | A1 | 11/2008 | Qiu et al. | |
| 2009/0009148 | A1 * | 1/2009 | Philbrick | 323/282 |
| 2009/0140711 | A1 * | 6/2009 | Philbrick et al. | 323/285 |
| 2010/0002480 | A1 * | 1/2010 | Huynh et al. | 363/90 |

(Continued)

*Primary Examiner* — Adolf Berhane
*Assistant Examiner* — Nusrat Quddus
(74) *Attorney, Agent, or Firm* — Gary Stanford

(57) ABSTRACT

A controller for a switch mode regulator with discontinuous conduction mode (DCM) correction which includes a correction network and a modulator. The correction network detects a low load condition indicative of regulation error during DCM and asserts an adjust value indicative thereof. The modulator receives the adjust value and adjusts operation accordingly to improve regulation during DCM. The correction network receives or determines a regulation metric, such as periods between successive pulses of a pulse control signal, or a current sense signal indicative of load current, and compares the regulation metric with one or more thresholds for determining the level of adjustment. Adjustment may be made using one or more methods, such as adjusting pulse on-time, adjusting pulse off-time, adjusting frequency of operation, etc.

33 Claims, 10 Drawing Sheets

(56) References Cited

U.S. PATENT DOCUMENTS

2010/0026256 A1* 2/2010 Liu et al. .................. 323/282
2010/0237841 A1* 9/2010 Matsuo et al. ............. 323/282
2010/0270995 A1* 10/2010 Laur et al. ................. 323/285
2011/0050185 A1* 3/2011 Notman et al. ............ 323/271
2011/0095731 A1* 4/2011 Zhao et al. ................ 323/205
2012/0126773 A1* 5/2012 Philbrick et al. .......... 323/286
2013/0314062 A1* 11/2013 Notman et al. ............ 323/271

* cited by examiner

SYSTEM AND METHOD FOR IMPROVING REGULATION ACCURACY OF SWITCH MODE REGULATOR DURING DCM

CROSS-REFERENCE TO RELATED APPLICATIONS

This application claims the benefit of U.S. Provisional Application Ser. No. 61/444,222, filed on Feb. 18, 2011, and U.S. Provisional Application Ser. No. 61/454,050, filed on Mar. 18, 2011, which are both hereby incorporated by reference in their entireties for all intents and purposes.

BRIEF DESCRIPTION OF THE DRAWINGS

The benefits, features, and advantages of the present invention will become better understood with regard to the following description, and accompanying drawings where.

DETAILED DESCRIPTION

Figure 1:
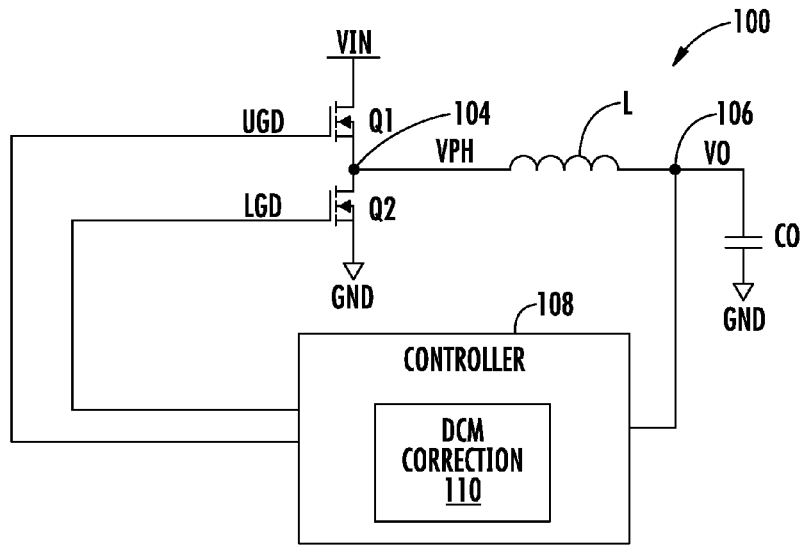
FIG. 1 is simplified block diagram of a buck-type DC-DC switch mode regulator including a controller with discontinuous conduction mode (DCM) correction implemented according to one embodiment.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

To provide precision regulation accuracy in pulse width modulation (PWM) DC-DC converters, it is typical to employ an integrator around the error-amplifier to greatly increase the direct current (DC) or low frequency gain of the control loop. The integrator and corresponding compensator time constants are sized to maximize transient speed and stability while minimizing offsets and other sources of regulation error at a particular operating frequency. As long as the system operates near that operating frequency, large signal effects and amplifier head-room issues are not a concern.

Modern loads, however, call for maximized converter power efficiency even at light loads. To accomplish this, architectures have begun utilizing discontinuous conduction mode (DCM) with switching frequency reduction to reduce switching loss and boost power conversion efficiency. As the frequency lowers with decreased loading, the control loop integrator stores ever increasing charge to account for any error over the period. Eventually, the error amplifier reaches the limits of its operating range and saturates to either of its rails minus headroom.

At this point, when the integrator can adjust no further, the output voltage can develop regulation errors. This error manifests itself as a function of load, creating an increased output impedance as the load varies below the point at which the error amplifier saturates.

A traditional solution to the problem described above is to slow the time constant of the integrator to avoid saturation over the range of expected loads. This solution, however, creates additional problems. First, there still exists a load at which saturation occurs (i.e., the problem has only been moved, not eliminated). Second, decreasing the time constant has a negative effect on loop transient response. Furthermore, accommodating the decreased time constant calls for additional output capacitance to hold the output voltage up in response to high load applications. Additional output capacitance is not desired.

A better approach, according to embodiments described herein, is to minimize the output impedance and regulation error in deep DCM operation with little or no impact on transient response. Instead of changing the loop time constants, at least one other regulation control variable is adjusted, such as, for example, reducing the on-time of a DCM pulse as the period increases. As the load decreases, the period increases and the DCM pulse width is reduced until the pulses are so thin that the output ripple from them and the DC offset is insignificant. Various regulation metrics may be used to detect the low load condition, such as periods between pulses of the pulse control signal (e.g., PWM signal used as switching control for regulation) or a current sense signal indicative of output current (e.g., inductor current or load current). Modulation operation is adjusted to improve regulation, such as adjusting pulse on-time (e.g., reducing pulse width), adjusting pulse off-time (e.g., reducing off time between pulses), adjusting modulation frequency (e.g., increasing frequency), etc. Various methods are disclosed herein for adjusting modulation, such as adjusting gain of a control amplifier, adjusting input and/or output of a control amplifier, adjusting frequency of an oscillator (e.g., VCO or the like), adjusting timeout of a timer, etc.

FIG. 1 is simplified block diagram of a buck-type DC-DC switch mode regulator 100 implemented according to one embodiment. The regulator 100 includes a controller 108 coupled to an output node 106 for receiving an output voltage VO. It is noted that a feedback network or the like (not shown) may be used to sense VO and provide a sensed version of VO (e.g., voltage divider or the like) rather than VO itself. The controller 108 is shown in general form, and may be implemented according to voltage mode control, current mode control, constant on-time (or constant frequency), etc., and may be configured as an analog controller, or a digital controller or the like.

The controller 108 provides an upper gate drive signal UGD to a gate terminal of upper switch Q1 and a lower gate drive signal LGD to a gate terminal of lower switch Q2. In the illustrated embodiment, electronic switches Q1 and Q2 are shown as a pair of N-channel metal oxide semiconductor field effect transistors (MOSFETs) as known to those skilled in the art. Other types of electronic switching devices may be used including other types of FETs and the like, and other types of transistors, such as bipolar junction transistors (BJTs) or insulated-gate bipolar transistors (IGBTs) and the like, etc. The switch Q1 has drain and source terminals coupled between VIN and a phase node 104 and the switch Q2 has drain and source terminals coupled between phase node 104 and ground (GND). The switches Q1 and Q2 are controlled to switch input voltage VIN through a phase node 104 at one end of an output inductor L, having its other end coupled to the output node 106 which develops the output voltage VO. The phase node 104 develops a phase voltage shown as VPH, and the output voltage VO is filtered by an output capacitor CO coupled between the output node 106 and GND.

In one embodiment, the controller 108 internally develops a pulse-width modulation (PWM) signal (FIG. 2) which is used to control the switches Q1 and Q2 to regulate VO to a predetermined voltage level. In normal operation, the controller 108 operates in a continuous conduction mode (CCM) in which one or the other of the switches Q1 and Q2 is on for the entire portion of each PWM cycle (ignoring deadtime periods between switching to ensure that only one of the switches is on at any given time). For example, when PWM goes to a first state (e.g., goes high) indicating a power portion, the controller 108 turns Q2 off (if it is on) and then turns on Q1 to couple the phase node 104 to VIN. When the PWM switches to a second state (e.g., goes low) in the same cycle, the controller 108 turns Q1 off and then turns Q2 on to couple the phase node 104 to GND for the remainder of the PWM cycle. Operation repeats in this manner for subsequent PWM cycles during CCM. The controller 108 controls the duty cycle of the PWM signal for regulation.

The controller 108 further operates in a discontinuous conduction mode (DCM) or diode-emulation mode (DEM) or the like during light load conditions to improve converter power efficiency. In one embodiment, during DCM, when the current through the output inductor L goes to zero, the lower switch Q2 is turned off and remains off for the remainder of the PWM cycle rather than staying on for the entire remainder of the PWM cycle. In the next cycle, Q1 is turned on generating current through the inductor L, and then is turned off and Q2 turned back on to decrease current through the inductor L. Again, when the inductor current reaches zero during the next cycle, Q2 is turned off and remains off until the following cycle. Operation repeats in this manner for DCM.

The controller 108 includes a DCM correction network 110 to reduce the on-time of PWM pulses during DCM as the period increases. In one embodiment, the DCM correction network 110 monitors the period between PWM pulses and produces signals that reduce the pulse width as the period increases as further described herein.

Figure 2:
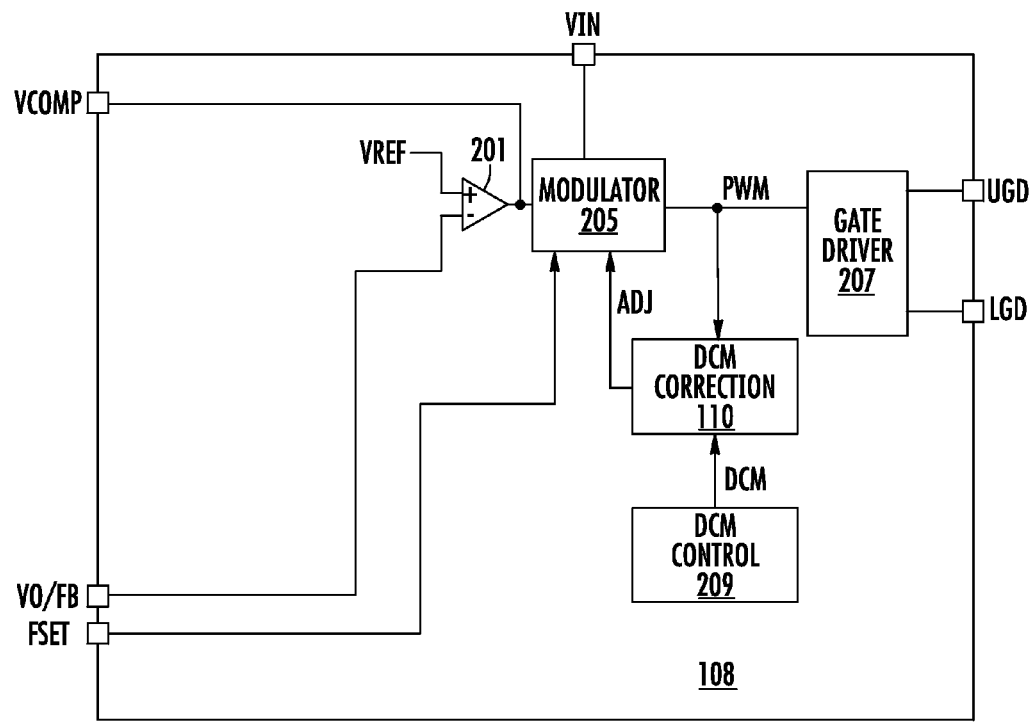
FIG. 2 is a is a simplified schematic and block diagram of the controller of FIG. 1 according to a more specific exemplary embodiment in which the PWM signal is used to detect low load condition during DCM for making adjustment to improve regulation.

FIG. 2 is a simplified schematic and block diagram of the controller 108 according to a more specific exemplary embodiment in which the PWM signal is used to detect low load condition during DCM for making adjustment to improve regulation. The controller 108 includes an error amplifier 201, a pulse width modulator 205, the DCM correction network 110, a gate driver 207, and a DCM control network 209. The controller 108 also includes inputs VO/FB and VCOMP for coupling a compensation network (e.g., 216, FIG. 4), a frequency set input FSET for setting a desired or target operating frequency, and output signals UGD and LGD for driving external electronic switches Q1 and Q2. An input is shown for receiving the input voltage VIN. In an alternative embodiment, VIN may be indirectly derived rather than being directly provided. The controller 108 may be provided on an integrated circuit (IC) or the like in which the inputs and outputs are configured as IC pins or the like. The controller 108 is shown in simplified form in which other input or output pins are not shown as not necessary for a full and complete understanding of embodiments according to the present invention.

The error amplifier 201 compares VO (or a sensed version thereof, e.g., FB) with a reference voltage VREF and provides a compensation voltage VCOMP to an input of the modulator 205. The modulator 205 may include a frequency control network or the like so that the modulator 205 operates at a frequency as controlled by FSET to develop the PWM signal, which is provided to the gate driver 207 and the DCM correction network 110. The gate driver 207 develops the UGD and LGD signals to control the external switches Q1 and Q2.

The DCM control network 209 generally detects the appropriate conditions (e.g., light load) for DCM and places the controller 108 in DCM if appropriate or otherwise allows the DCM to be enabled. The DCM control network 209 asserts a DCM signal to activate the DCM correction network 110 during DCM. The DCM correction network 110 monitors the PWM signal and provides an adjust value ADJ to the modulator 205 to adjust operation as further described herein. The ADJ value may be implemented with one or more adjust values.

Figure 3:
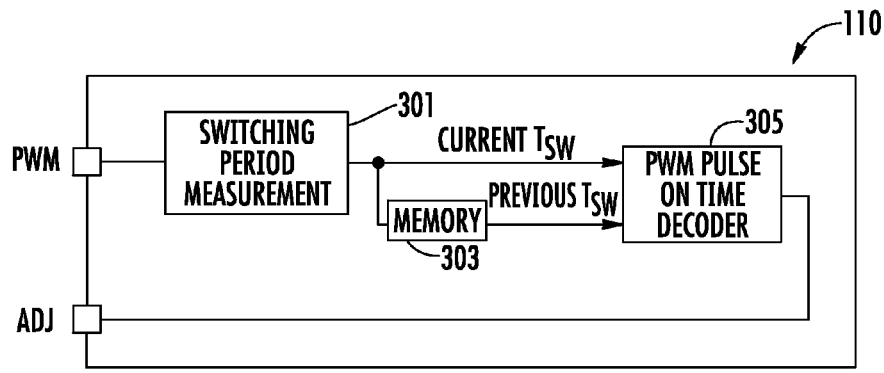
FIG. 3 is a more detailed block diagram of the DCM correction network of FIG. 1 according to an exemplary embodiment.

FIG. 3 is a more detailed block diagram of the DCM correction network 110 according to an exemplary embodiment. The DCM correction network 110 includes a switching period measurement network 301 for measuring the current switching period $T_{SW}$ between PWM pulses, a memory 303 for storing the current period $T_{SW}$ and providing a previous $T_{SW}$, and a PWM pulse on-time decoder 305. The previous $T_{SW}$ is a delayed version of the current $T_{SW}$ delayed by one switching cycle. The PWM pulse on-time decoder 305 receives the current $T_{SW}$ and the previous $T_{SW}$ and provides the frequency control ADJ value.

The ADJ value may have any one of several different forms (e.g., current, voltage, analog, digital, etc.) and may control any one or more of several different operating parameters as further described below. In general, during DCM the ADJ value is used to reduce PWM pulse width of selected pulses, which also generally increases operating frequency. The amount of adjustment may be determined based on a tradeoff between efficiency and output voltage accuracy.

Figure 4:
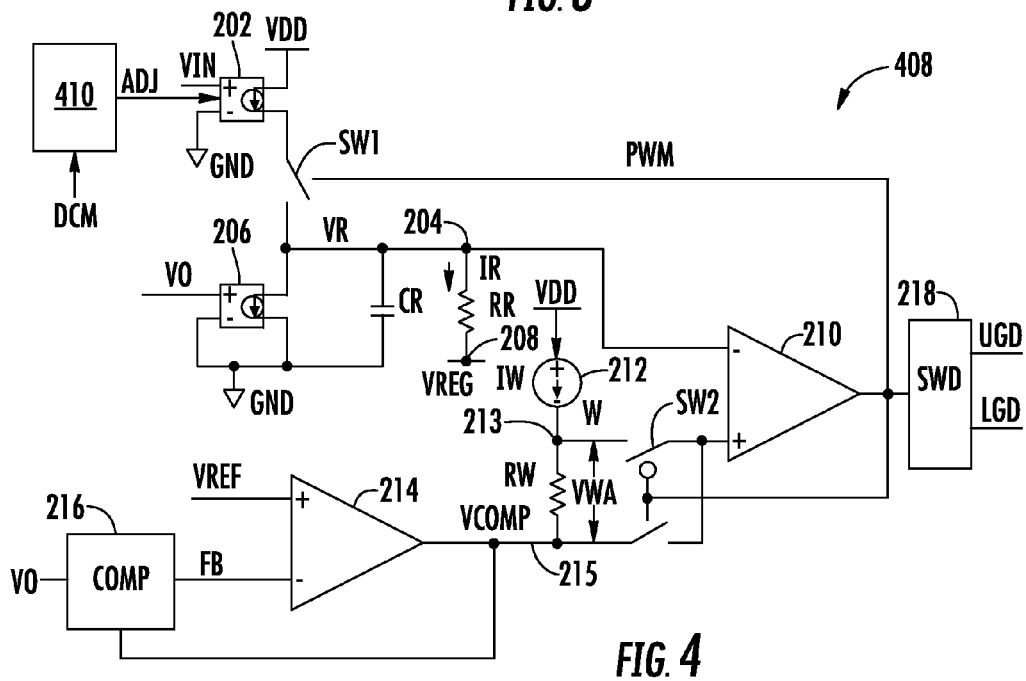
FIG. 4 is a schematic and block diagram of a controller according to a more specific exemplary embodiment of the controller of FIG. 1 which uses synthetic ripple to regulate the PWM pulse and period.

FIG. 4 is a schematic and block diagram of a controller 408 according to a more specific exemplary embodiment of the controller 108 which uses synthetic ripple to regulate the PWM pulse and period. Synthetic ripple regulation senses or otherwise replicates the voltage across an output inductor (e.g., output inductor L) and generates a corresponding current provided to a ripple capacitor, in which the ripple voltage developed across the ripple capacitor is indicative of the ripple current through the output inductor. The synthetically generated ripple voltage to control toggling of a hysteretic comparator or the like to develop a PWM signal used for regulation control. The input voltage VIN is provided to the positive voltage input of a transconductance amplifier 202, which has a negative voltage input coupled to GND. The transconductance amplifier 202 has an adjustable transconductance gain GM1, the value of which is determined or otherwise adjusted by the ADJ value provided by a DCM correction network 410. In this case, the DCM correction network 410 is a more specific configuration of the DCM correction network 110 for adjusting the gain of a transconductance amplifier within a synthetic ripple regulator as described further herein. The DCM correction network 410 receives a DCM enable signal for activation during DCM mode. If not in DCM, the DCM correction network 410 and/or the output ADJ is disabled so that adjustment to the gain of the transconductance amplifier 202 is not made. The transconductance amplifier 202 has a pair of outputs coupled between a supply voltage VDD and a first switched terminal or pole of a single-pole, single-throw (SPST) switch SW1. VDD is used in various places as a source or supply voltage relative to GND. The other switched terminal of the switch SW1 is coupled to a "ripple" node 204 and the switch SW1 includes a control input receiving a PWM signal.

The output voltage VO (or sensed version thereof) is provided to the positive voltage input of another transconductance amplifier 206, having its negative voltage input coupled to GND. The transconductance amplifier 206 has a transconductance gain GM2. The current output terminals of the transconductance amplifier 206 are coupled between node 204 and GND. A ripple capacitor CR is coupled between node 204 and GND and a ripple resistor RR is coupled between node 204 and a node 208 providing a "regulated" voltage level VREG. VREG may be GND or a small constant voltage, such as 1 Volt (V). A ripple current IR is shown flowing into the ripple resistor RR from node 204 to node 208.

The node 204 develops a ripple voltage VR and is coupled to the inverting (−) input of a comparator 210. The non-inverting (+) input of the comparator 210 is selectively coupled to receive either a compensation voltage VCOMP developed on a node 215 or a window voltage W developed on a window node 213. An internal reference voltage VREF is provided to the non-inverting (+) input of the error amplifier (EA) 214. The output voltage VO is provided to the input of a compensation network 216, having its output providing a feedback signal FB to the inverting (−) input of the EA 214. As understood by those skilled in the art, the compensation network 216 senses (e.g., using a sense circuit such as a voltage divider or the like) and otherwise provides compensation of the output voltage VO and develops the FB signal. The EA 214 amplifies the difference between VREF and FB to develop VCOMP reflecting an error of the output voltage VO. In the embodiment illustrated, the compensation network 216 and EA 214 together form an integrator with compensation for controlling the loop.

A window current generator 212 has an output coupled to the window node 213 for providing a window current IW to one end of a window resistor RW, which has its other end coupled to node 215. The window node 213 develops a window voltage W, which is the adjusted window voltage VWA added to VCOMP, or W=VWA+VCOMP. The selection between nodes 213 and 215 as input to the comparator 210 is based on the state of a switch SW2 configured to operate similar to a single-pole, double throw (SPDT) switch as controlled by the PWM signal. The output of the comparator 210 provides the PWM signal used to control the switches SW1 and SW2, and which is provided to the input of a switch driver (SWD) 218. The switch driver 218 has respective outputs providing the UGD and LGD signals provided to the power electronic switches Q1 and Q2 as previously described.

During normal CCM operation, the transconductance amplifier 206 constantly draws current based on the output voltage VO (e.g., proportional to VO based on a transconductance gain GM2 of 206) from node 204 to continuously discharge the ripple capacitor CR. When the switch SW1 is closed upon assertion of the PWM signal, a current based on the input voltage VIN (e.g., proportional to VIN based on the transconductance gain GM1 of 202) is provided through the switch SW1 by the transconductance amplifier 202 to charge the capacitor CR. Since VIN is greater than VO, when the switch SW1 is closed the capacitor CR is charged by a collective current based on a difference between GM1*VIN and GM2*VO. In one embodiment, GM1 and GM2 are configured to be approximately the same during normal operation. It is noted, however, that ADJ adjusts GM1 as further described herein. When the switch SW1 is opened by PWM, the capacitor CR is discharged based on VO. As understood by those skilled in the art, the voltage VO is continually applied to one end of the output inductor L. The other end of the output inductor L is switched between the input voltage VIN and GND, causing a ripple current to flow through the output inductor L based on VIN and VO. In this manner, the voltage VR on ripple node 204 is a ripple voltage representing the ripple current through output inductor L.

The EA 214 develops the VCOMP signal as a compensation voltage indicative of the relative error of the output voltage VO. In particular, VO is compared to the reference voltage VREF which represents a target voltage level of VO.

When PWM is asserted to its first state, the voltage of VR rises at a constant rate and the switch SW2 selects the window node 213 providing the window voltage W=VCOMP+VWA. When the voltage of VR rises above the voltage of VWA+VCOMP, the comparator 210 switches PWM to its second state causing the switch SW2 to switch to selecting VCOMP on node 215 and causes the switch SW1 to open so that VR decreases at a constant rate based on VO. In this manner, the comparator 210 operates as a hysteretic comparator which compares the synthetic ripple voltage VR within a window voltage between VCOMP and W.

Figure 5:
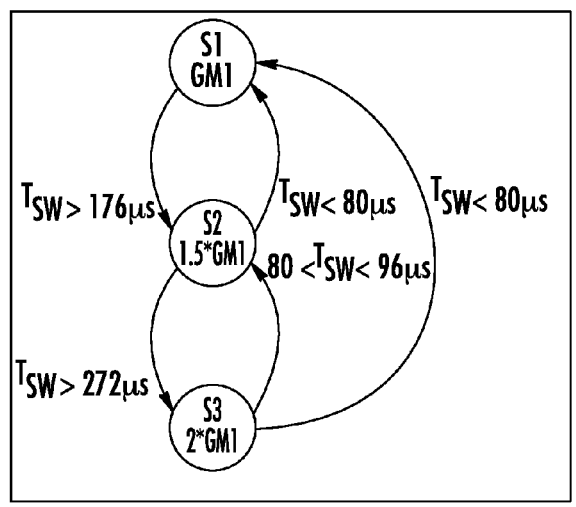
FIG. 5 is a state diagram illustrating operation of the DCM correction network of FIG. 4 according to one embodiment.

FIG. 5 is a state diagram illustrating operation of the DCM correction network 410 according to one embodiment. During normal CCM operation, the DCM correction network 410 is either disabled or otherwise remains in a first state S1 in which ADJ is either not provided or is asserted so that the transconductance amplifier 202 remains at its normal gain value of GM1 (so that it outputs a current GM1*VIN). In one embodiment, for example, ADJ has a default level or value or the like during normal CCM operation. When the controller 408 enters DCM operation, the DCM correction network 410 is enabled and begins in the first state S1 with normal gain GM1. During DCM, when the DCM correction network 410 detects a switching period $T_{SW}$ between PWM pulses greater than 176 microseconds (μs), it transitions to a second state S2. In one embodiment, the switching period $T_{SW}$ is measured between each activation of the PWM pulse during DCM. In state S2, ADJ is asserted to a first adjust value to increase the gain of the transconductance amplifier 202 by 50%, or to 1.5*GM1. During DCM, the DCM correction network 410 continues to monitor each new switching period (current $T_{SW}$) with the immediately prior switching period (previous $T_{SW}$) for determining the appropriate operating state. Operation remains in state S2 while the switching period $T_{SW}$ is greater than 80 μs but less than 272 μs. If, while in state S2, the switching period $T_{SW}$ decreases to less than 80 μs, then operation returns to state S1.

If, while in state S2, the next switching period between PWM pulses exceeds 272 μs, then the DCM correction network 410 transitions into state a third S3. In state S3, ADJ is asserted to a second adjust value to increase the gain of the transconductance amplifier 202 by 100% relative to its normal level, or to 2*GM1. If, while in state S3, the next detected $T_{SW}$ period between DCM pulses is between 80 and 96 μs, then the DCM correction network 410 transitions back to state S2. If, while in state S3, the next detected switching $T_{SW}$ period between PWM pulses is less than 80 μs, then operation transitions back to state S1. Otherwise, if $T_{SW}$≥90 μs, then operation remains in state S3.

In general, during DCM or when DCM is allowed, the switching period $T_{SW}$ is compared with one or more timing or duration thresholds. The specific value of the duration thresholds are determined based on the particular implementation. The ADJ value is modified based on the whether certain duration thresholds are met during DCM to modify operation of the modulator to improve regulation during DCM.

Referring back to FIG. 4, a window voltage is established between VCOMP and W at one input of the comparator 210. When PWM is asserted at its second state, such as low, then SW1 is opened and switch SW2 selects VCOMP at the non-inverting input of the comparator 210. In this case, VR ramps down at a relatively constant rate based on GM2*VO. When VR reaches VCOMP, the comparator 210 switches PWM to its first state, such as high, which closes switch SW1 and causes switch SW2 to select the upper window voltage W. During normal CCM operation, VR ramps up at a relatively constant rate based on GM1*VIN−GM2*VOUT. When VR ramps up to the voltage level of W, the comparator 210 switches again to switch PWM back to its second state. The width of each PWM pulse, therefore, is related to the rising ramp rate of VR. In DCM, when the switching period $T_{SW}$ meets certain duration conditions as shown in FIG. 5, the gain of the trans conductance amplifier 202 is modified to increase the ramp of VR, which decreases the pulse width of the PWM signal (e.g., by 33.3% in state S2 and by 50% in state S3). The decrease of pulse width also tends to increase the frequency of operation.

Figure 14:
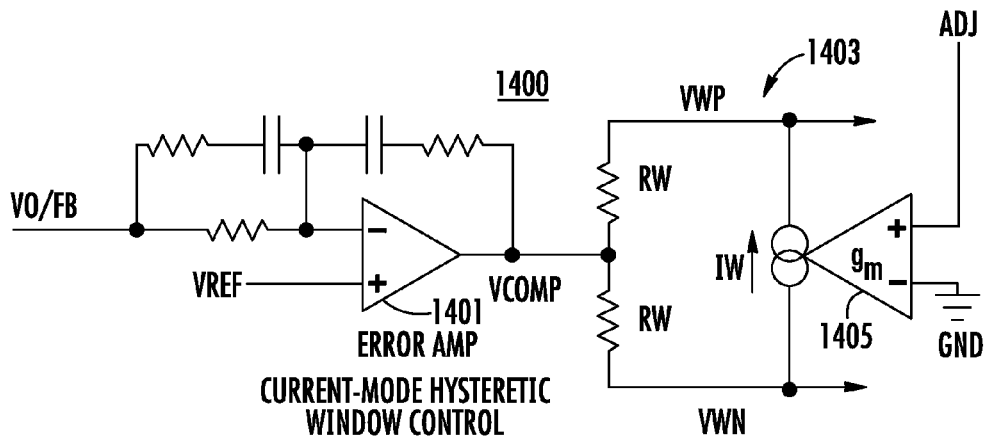
FIG. 14 is a simplified schematic diagram of a current-mode hysteretic window control modulator which is configured to adjust operating frequency operation based on an adjust value according to another embodiment.

The DCM correction network 110 is a more general version in which the ADJ value is used to adjust any one or more of selected parameters to adjust PWM pulse width during DCM. As stated earlier, embodiments described herein reduce output impedance and regulation error in deep DCM operation, with little or no impact on transient response, by reducing the on-time of PWM pulses as the period increases during DCM. The width of a PWM pulse may be decreased in one of several ways. In one embodiment, an adjustment is made to the gain of a transconductance amplifier for synthetic ripple regulation as described above with reference to FIGS. 4 and 5. Increasing the transconductance gain increases the rate at which VR ramps up and the speed at which it traverses the window voltage VWA. This reduces the PWM pulse on-time and output voltage ripple, and thereby increases the switching frequency. In another embodiment, the value of a window resistor (e.g., RW) is reduced. Reducing the window resistor RW reduces the voltage of VWA. Reducing the VWA window reduces the PWM pulse on-time, again at a cost of higher switching frequency. In a third embodiment, the value of window current IW is reduced (FIG. 14). Reducing the window current IW also reduces the voltage of VWA, with a similar effect as reduced resistance on DCM pulse on-time.

Alternative configurations are contemplated for other types of switching regulators, such as voltage mode regulators, current mode regulators, peak current mode regulators, constant on-time regulators, etc., as further illustrated below.

Since the compensation network at the loop error amplifier is not adjusted, transient response is not affected because the loop time constants have not been changed. The output voltage regulation is maintained across the entire load spectrum. One tradeoff with this approach is that there may be some reduction in light load efficiency as the converter operates at a higher DCM frequency than it does normally during CCM. In one specific application, about 400 microamperes (μA) of PVCC current was added at 0 load. This is a small tradeoff as the part has an overall quiescent current of about 5 milliamperes (mA). It is noted that PVCC is a power supply voltage similar to VCC but often separated from VCC and dedicated for gate drive applications (for isolation or to provide different supply voltage levels). VCC is typically used for quiescent bias of the integrated circuit (IC). In certain applications, PVCC draws relatively high current spikes during switching events. A power supply designer may choose where to make that tradeoff between very light load efficiency and regulation accuracy based on which metric is deemed more important.

In one embodiment, the DCM correction circuit 110 uses a timer that is reset on the rising edge of each PWM pulse. If the period is longer than a set point on the timer, the next pulse width is reduced. If the next period is longer than a shorter set point, then the shorter pulse width carries forward.

Figure 6:
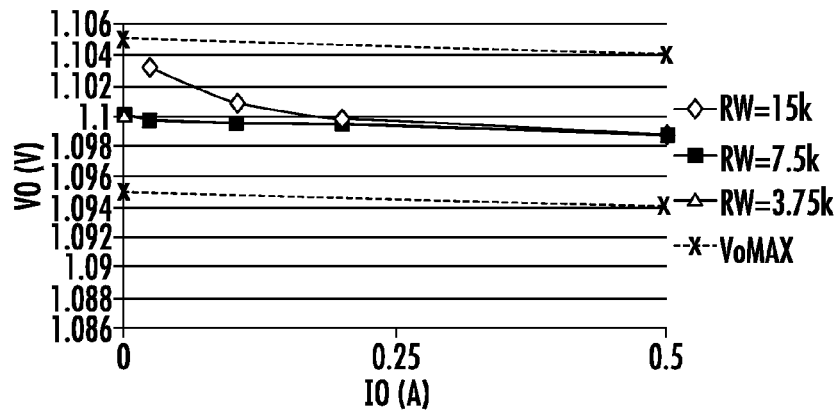
FIGS. 6-8 are plots depicting output voltage regulation, DCM frequency, and DCM PVCC current, respectively, as a function of output load for a test apparatus.

FIG. 6 is a plot of the output voltage VO as a function of output load current (IO) for three different window resistor sizes (RW=15 kΩ, 7.5 kΩ, and 3.75 kΩ) on a test apparatus. As the window resistor size is decreased, the light load DCM offset becomes insignificant. A window resistor size of 15 kΩ is the typical for the application and it corresponds with an operating frequency of 300 kilohertz (kHz) in CCM. Modifying the gain of the transconductance amplifier as previously described has a similar affect as reducing the window size, but also provides better jitter performance.

Figure 7:
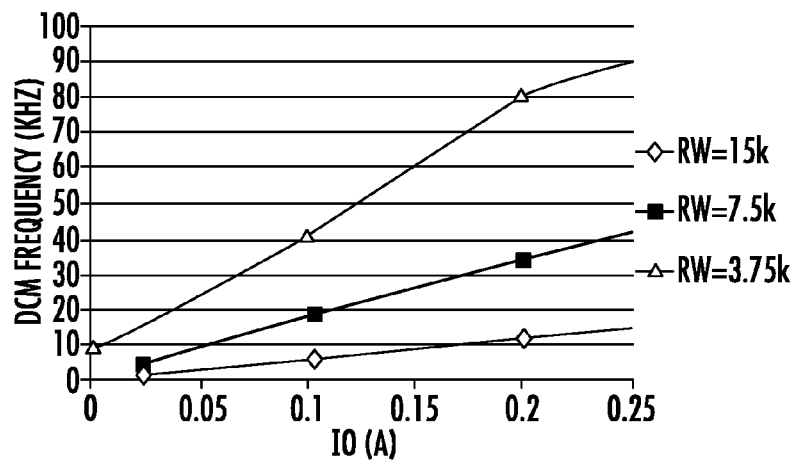

FIG. 7 is a plot depicting the DCM frequency as a function of output load (IO) and window resistor size (RW=15 kΩ, 7.5 kΩ, and 3.75 kΩ) for the same test apparatus of FIG. 6. As the window resistor size is decreased, or as the output load increases, the DCM frequency increases.

Figure 8:
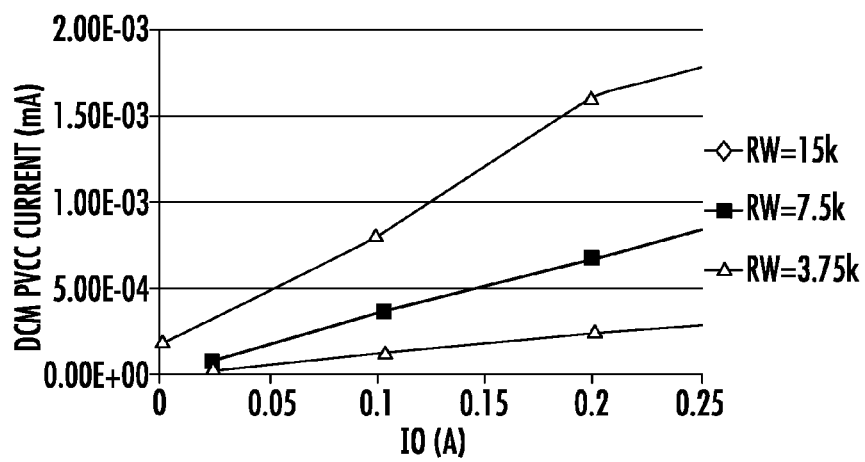

FIG. 8 is a plot depicting the DCM PVCC quiescent current as a function of output load and window resistor size (RW=15 kΩ, 7.5 kΩ, and 3.75 kΩ) for the same test apparatus of FIG. 6. As the window resistor size is decreased, or as the output load increases, the DCM PVCC quiescent current increases.

Figure 9:
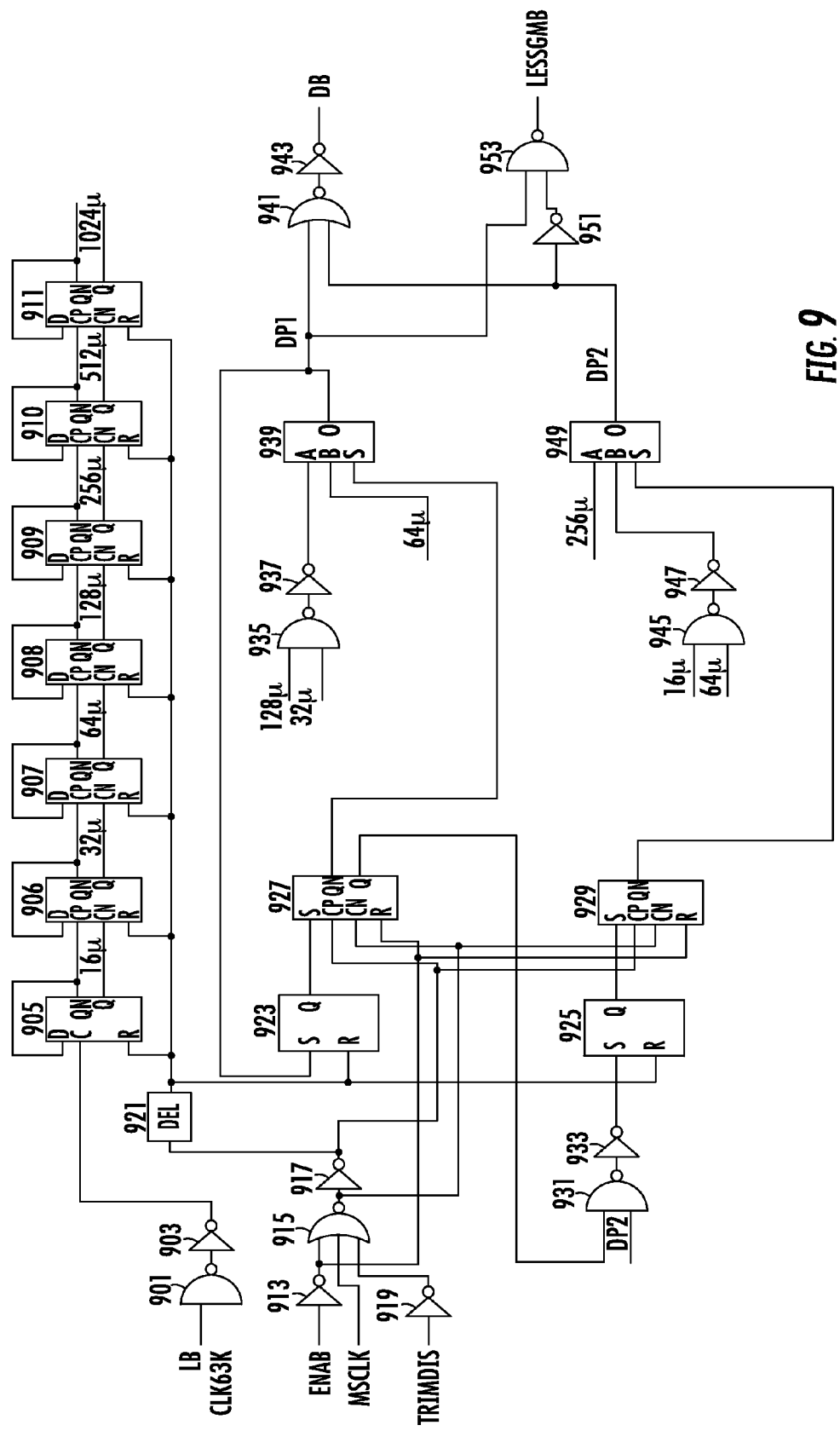
FIG. 9 is a more detailed schematic diagram of a DCM correction network according to one embodiment for transconductance gain adjustment based on PWM.

FIG. 9 is a more detailed schematic diagram of a DCM correction network 901 according to one embodiment for transconductance gain adjustment based on PWM. Signals LB and CLK63K are provided to respective inputs of a NAND gate 901, having an output coupled to an input of an inverter 903. The output of the inverter 903 is coupled to the clear input of a D-type flip-flop (DFF) 905. DFF 905 is the first of a series of DFFs 905-911, each having an inverting Q output (QN) coupled back to its D input. Also, QN of each of the DFFs 905-910 are coupled to a positive clear (CP) input of the next DFF in the series. Further, each of the DFFs 905-910 has a non-inverting Q output coupled to a negative clear (CN) input of the next DFF in the series. The series of DFFs 905-911 form a timing delay circuit in which the Q outputs of the DFFs 905-911 output clock signals delayed by 16 μs, 32 μs, 64 μs, 128 μs, 256 μs, 512 μs and 1024 μs, respectively, shown as signals 16μ, 32μ, 6μ, 128μ, 256μ, 512μ and 1024μ, respectively. The specific timing values are exemplary only and may be modified for different configurations or implementations.

An enable signal ENAB is provided to the input of an inverter 913, having its output coupled to one input of a NOR gate 915 and to reset inputs of two DFFs 927 and 929. A signal MSCLK is provided to another input of the NOR gate 915. A signal TRIMDIS is provided to a third input of the NOR gate 915, having an output coupled to the input of an inverter 917 and to the CN inputs of DFFs 927 and 929. The output of the inverter is provided to an input of a delay block 921 and to the CP inputs of the DFFs 927 and 929. In one embodiment, the delay block 921 inserts a relatively short delay, such as 10 nanoseconds (ns) or the like. The output of the delay block 921 is provided to the reset input of each of the DFFs 905-911 and to the reset inputs of a pair of RS latches 923 and 925. A signal DP1 is provided to the set input of the RS latch 923, which has its Q output coupled to the D input of DFF 927. The Q output of DFF 927 is provided to one input of a NAND gate 931 receiving a signal DP2 at its other input and having an output coupled to an input of an inverter 933. The output of the inverter 933 is coupled to the set input of the RS latch 925. The Q output of the RS latch 925 is coupled to the D input of DFF 929.

The QN output of DFF 927 is provided to the select input of a first multiplexer (MUX) 939 and the QN output of DFF 929 is provided to the select input of a second MUX 949. The signals 128μ and 32μ are provided to respective inputs of a NAND gate 935 having its output coupled through an inverter 937 to the A input of MUX 939. The signal 64μ is provided to the B input of MUX 939, having its output providing the DP1 signal which is provided to one input of a NOR gate 941 and to one input of a NAND gate 953. The signal 256μ is provided to the A input of MUX 949 and the signals 16μ and 64μ are provided to respective inputs of a NAND gate 945, having its output coupled through an inverter 947 to the B input of MUX 949. The output of MUX 949 provides a signal DP2 which is provided to the other input of the NOR gate 941 and to the input of an inverter 951. The output of the inverter 951 is provided to the other input of the NAND gate 953. The output of the NOR gate 941 is inverted by inverter 943 which asserts a signal DB at its output. The output of the NAND gate 953 asserts a signal LESSGMB.

DB is an output that doubles GM1*VIN which halves the PWM pulse width. LESSGMB increases GM1*VIN by 50%. LB is an input which is asserted 30 μs after each PWM pulse and reset on PWM. CLK63K is a 63 kHz clock input. MSCLK is an input pulse that is asserted to initiate each PWM. ENAB and TRIMDIS are inputs that reset the circuit.

Figure 10:
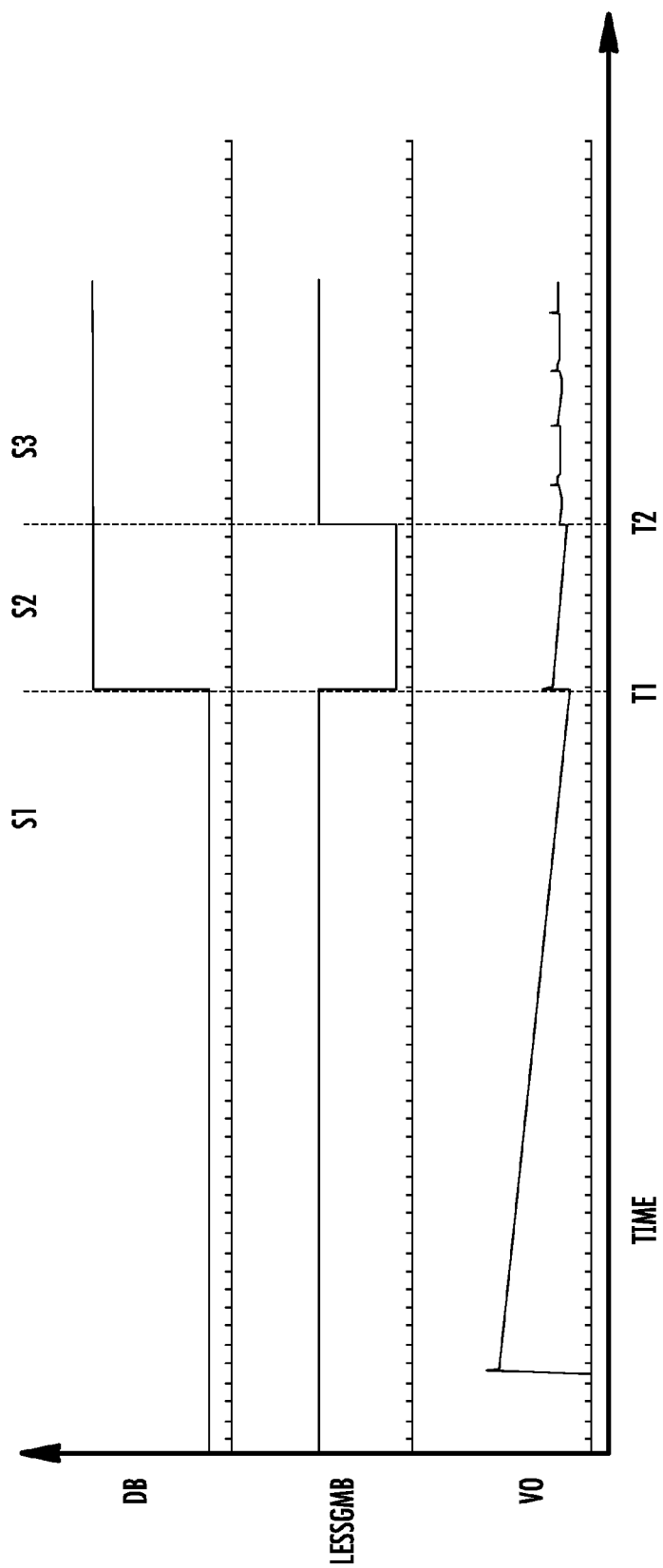
FIG. 10 is a timing diagram of a simulation of output signals of the DCM correction network of FIG. 9 in relation to VO.

FIG. 10 is a timing diagram of a simulation of output signals DB and LESSGMB of the DCM correction network 901 of FIG. 9 in relation to the output voltage VO. The states of DB and LESSGMB also correspond with the states S1, S2 and S3 of the state diagram of FIG. 5. Prior to a time T1, DB is low and LESSGMB is high corresponding to state S1. At time T1, DB goes high and LESSGMB goes low corresponding with state S2. The ripple on VO is noticeably reduced after time T1 for improved regulation. At time T2, LESSGMB goes high corresponding with state S3. The ripple on VO is further reduced after time T2 for improved regulation.

Figure 11:
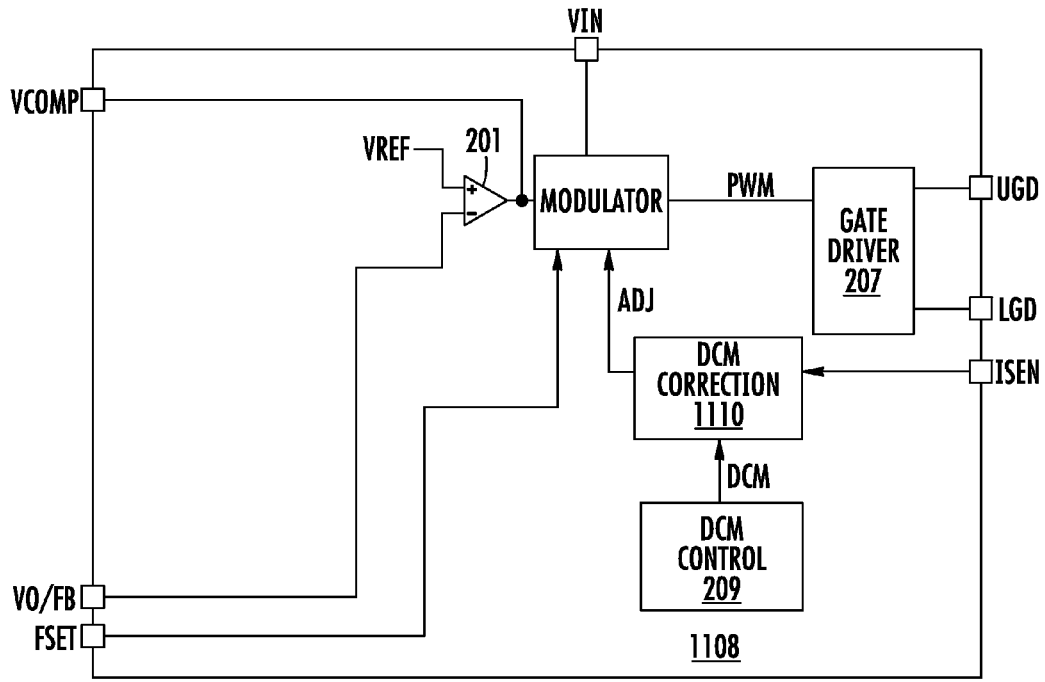
FIG. 11 is a simplified schematic and block diagram of the controller according to another exemplary embodiment in which a signal indicative of load current is used to detect low load condition during DCM for making adjustment to improve regulation.

FIG. 11 is a simplified schematic and block diagram of the controller 1108 according to another exemplary embodiment in which a signal indicative of load current is used to detect low load condition during DCM for making adjustment to improve regulation. The controller 1108 is substantially similar to the controller 108 in which similar components assume identical reference numbers. In this case, The DCM correction network 110 is replaced by a DCM correction network 1110 which receives a current sense signal ISEN. ISEN represents an output current, such as load current provided to a load coupled to the output node 106 receiving VO as the source voltage. The load current may be measured directly to develop ISEN which is provided to the controller 1108. The load current may be measured indirectly to develop ISEN. In one embodiment, for example, the current through the output inductor L is monitored and the DC value of the inductor current is determined and provided as ISEN to the controller 1108. The DCM correction network 1110 monitors the ISEN signal (rather than PWM) and provides the ADJ value to the frequency control network 203 to adjust operation.

Figure 12:
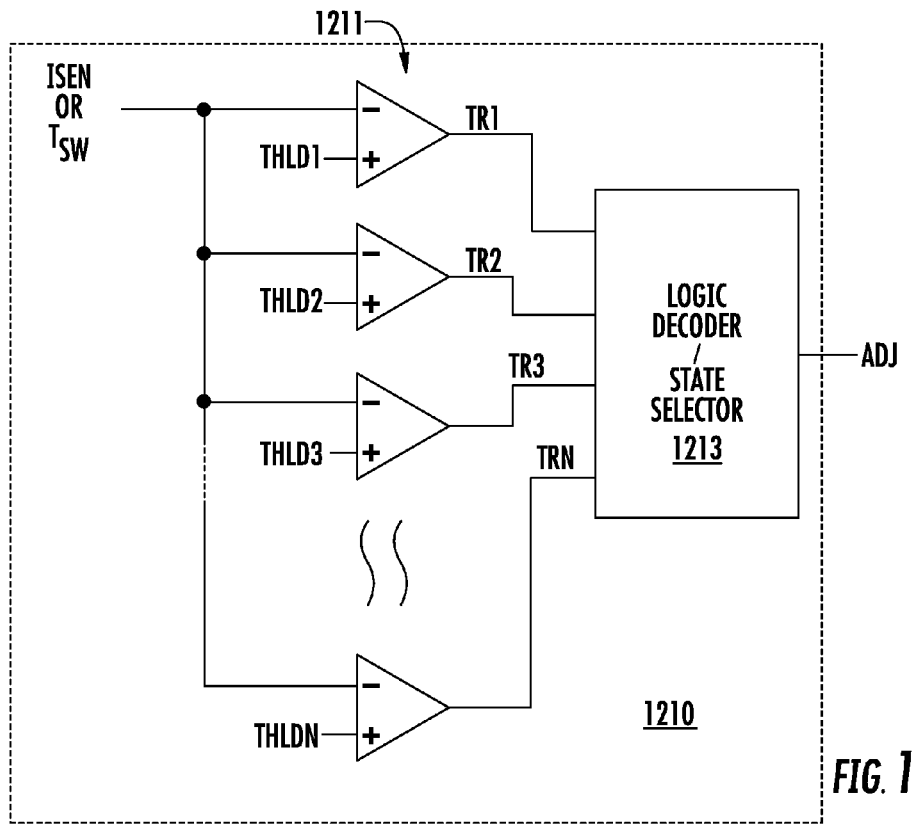
FIG. 12 is a simplified schematic and block diagram of a DCM correction network according to a digital front end embodiment.

FIG. 12 is a simplified schematic and block diagram of a DCM correction network 1210 according to a digital front end embodiment. In this case, either load current (e.g., as represented by ISEN) or the switching period (e.g., as represented by $T_{SW}$ for periods between pulses of PWM) is provided to a set of N comparators 1211, each receiving a corresponding one of N threshold values THLD1-THLDN (in which N is a positive integer). The outputs of the comparators 1211 provide a set of N trigger signals TR1-TRN, which are provided to respective inputs of a logic decoder/state selector 1213 which develops the ADJ value. Thus, as the load current (as indicated by ISEN) and/or switching period $T_{SW}$ reaches certain predetermined (or programmable) thresholds (THLD1-THLDN) and operation is adjusted accordingly. The level of the adjust value(s) is based on the number of trigger signals TR1-TRN that are provided indicating the level of ISEN or $T_{SW}$.

Figure 13:
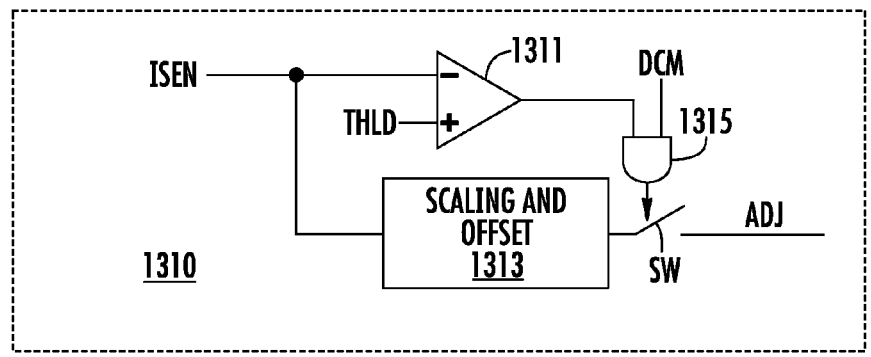
FIG. 13 is a simplified schematic and block diagram of a DCM correction network according to an analog front end embodiment.

FIG. 13 is a simplified schematic and block diagram of a DCM correction network 1310 according to an analog front end embodiment. In this case, the load current (e.g., as represented by ISEN) is provided to a comparator 1311 which compares the sensed load current with a threshold value THLD. ISEN is also provided to a scaling and offset network 1313, which outputs the ADJ value through one or more switches SW. The output of the comparator 1311 is provided to one input of a 2-input AND gate 1315, which receives the DCM signal at another input. When DCM is asserted to indicate that DCM is allowable (or active), and when ISEN achieves THLD, the AND gate 1315 closes the switch SW so that the ADJ value is provided to adjust operation. Of course, if DCM is not enabled or when ISEN does not meet the threshold condition, operation is not adjusted.

FIG. 14 is a simplified schematic diagram of a current-mode hysteretic window control modulator 1400 which is configured to adjust operating frequency operation based on the ADJ value according to another embodiment. As used herein, a modulator is the control function used to develop the pulse control signal (e.g., PWM) within the controller of a regulator. VO or FB and VREF are provided to an error amplifier 1401 with compensation network (resistor-capacitor or RC network) which outputs the VCOMP voltage to a window network 1403. The window network 1403 is similar to that shown in FIG. 4 except that VCOMP is centered via a pair of window resistors RW between an upper window voltage VWP and a lower window voltage VWN. A transconductance amplifier 1405 or the like adjusts the window current IW based on the ADJ value. The adjustment of the window current IW adjusts the frequency of operation of the modulator 1400. For example, reducing window current during DCM increases the frequency of operation.

Figure 15:
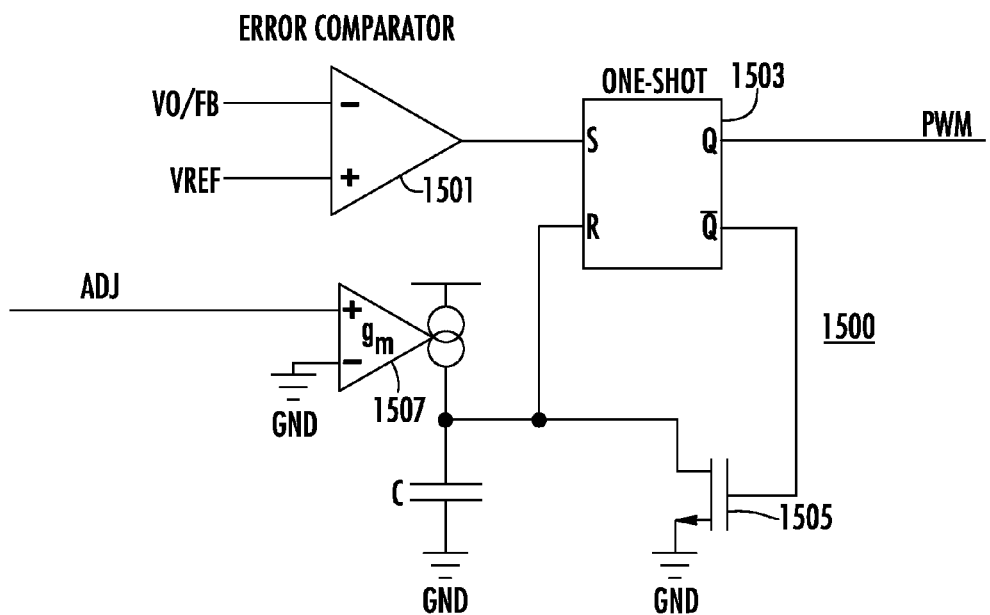
FIG. 15 is a simplified schematic diagram of a constant on-time modulator which is configured to adjust PWM on-time and operating frequency operation based on the adjust value according to another embodiment.

FIG. 15 is a simplified schematic diagram of a constant on-time modulator 1500 which is configured to adjust PWM on-time and operating frequency operation based on the ADJ value according to another embodiment. In this case, VO or FB and VREF are provided to the inputs of an error comparator 1501, having an output used to set a one-shot RS latch 1503 for asserting PWM high. While PWM is high, a current source feeding a capacitor C is used to reset the latch to pull PWM back low. While PWM is low, a FET switch 1505 or the like grounds the capacitor C to hold reset low for the next PWM cycle. The current source typically has a predetermined or constant level for normal operation. In this case, however, the current source is an adjustable transconductance amplifier 1507 having an input receiving the ADJ value and an output providing the current to the capacitor C. The ADJ value adjust the amount of current provided to the capacitor C during DCM to adjust the pulse width of the PWM signal, which further adjusts the frequency of operation. For example, increasing the current causes sooner reset and thus narrower pulses on PWM with a corresponding frequency increase.

Figure 16:
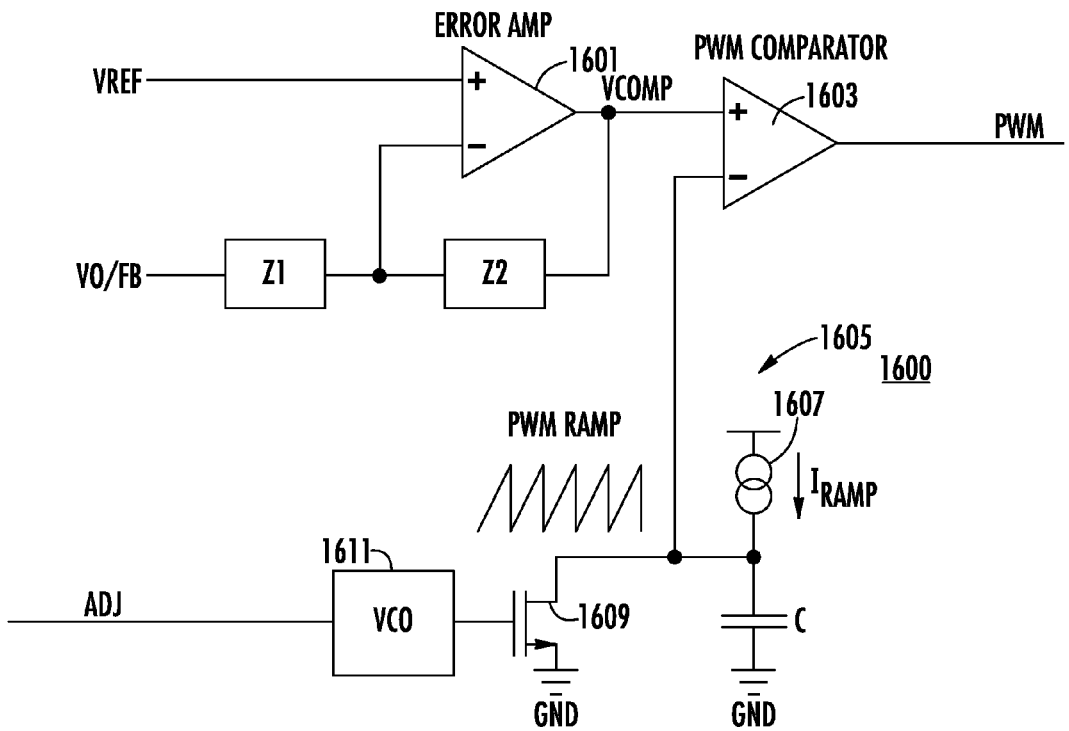
FIG. 16 is a simplified schematic diagram of a voltage mode modulator which is configured to adjust operating frequency operation based on the adjust value according to another embodiment.

FIG. 16 is a simplified schematic diagram of a voltage mode modulator 1600 which is configured to adjust operating frequency based on the adjust value according to another embodiment. In this case, VO or FB and VREF are provided to respective inputs of an error amplifier 1601 with compensation (shown as Z1 and Z2, such as an RC integrating network) for developing VCOMP provided to a comparator 1603. The comparator 1603 compares VCOMP with a PWM RAMP signal provided by a ramp generator 1605 and outputs the PWM signal. The PWM RAMP signal is developed by a current source 1607 providing a ramp current IRAMP to a capacitor C. The voltage of the capacitor C is "cleared" or reset back to zero by a FET switch 1609 or the like as controlled by an oscillator or the like. The ramp current and the frequency of the oscillator are typically determined to provide a desired frequency of operation during normal operation. In this case, the oscillator is a voltage-controlled oscillator (VCO) 1611 or the like which may be adjusted by the adjust value for adjusting the frequency of operation during DCM. The output of the VCO controls the gate of the FET switch 1609. Although increasing frequency may also adjust the peak of the PWM RAMP signal, in various embodiments the peak level may be maintained, such as by adjusting IRAMP accordingly. In any case, the frequency of operation is adjusted during DCM.

Figure 17:
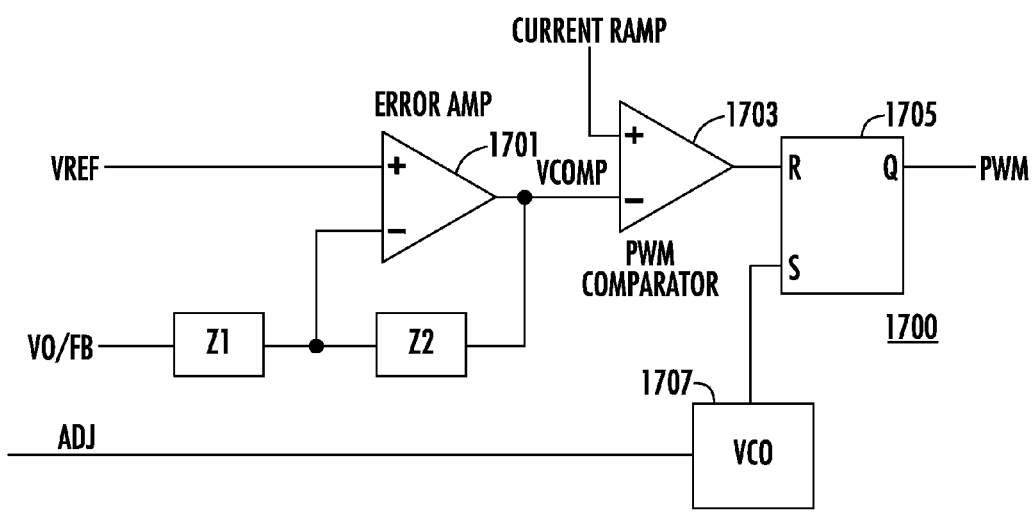
FIG. 17 is a simplified schematic diagram of a peak current mode modulator which is configured to adjust operating frequency operation based on the adjust value according to another embodiment.

FIG. 17 is a simplified schematic diagram of a peak current mode modulator 1700 which is configured to adjust operating frequency based on the adjust value according to another embodiment. In this case, VO or FB and VREF are provided to respective inputs of an error amplifier 1701 with compensation (Z1, Z2) for developing VCOMP provided to a comparator 1703. The comparator 1703 compares VCOMP with a current ramp signal and outputs a reset signal used to reset an RS latch 1705 for asserting PWM low. The RS latch 1705 is set to pull PWM back high by an oscillator or the like during normal operation. In this case, the oscillator is a VCO 1707 or the like which may be adjusted by the adjust value for adjusting the frequency of operation during DCM. Thus, the frequency of operation is adjusted during DCM.

Figure 18:
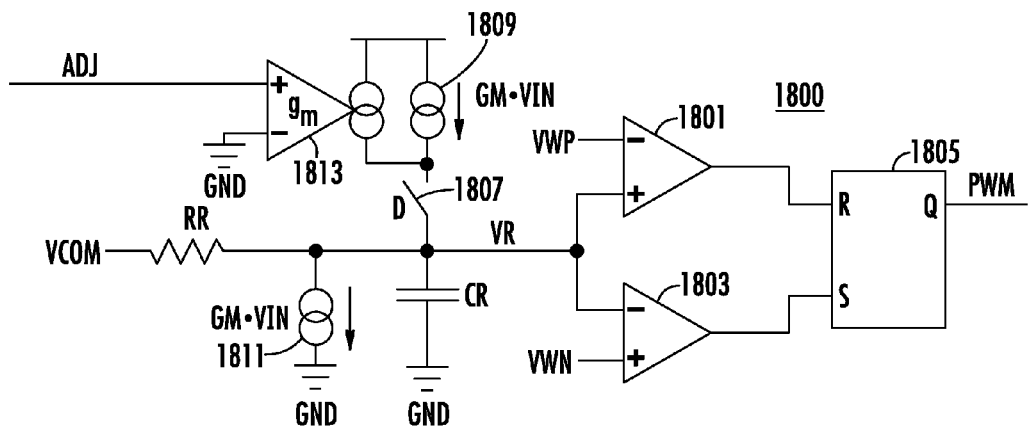
FIG. 18 is a simplified schematic diagram of a synthetic current-mode hysteretic ripple modulator similar to that used within the controller of FIG. 4 to regulate PWM pulse and period.

FIG. 18 is a simplified schematic diagram of a synthetic current-mode hysteretic ripple modulator 1800 similar to that used within the controller 408 to regulate PWM pulse and period. In a similar manner as described for the controller 408, a ripple voltage VR is developed across a ripple capacitor CR. A ripple resistor RR is coupled to the ripple voltage and receives a "common" voltage VCOM which operates in similar manner as VREG previously described. In this case, VR is shown provided to respective inputs of a pair of comparators 1801, 1803 implementing a hysteretic comparator, for comparing VR to window voltages VWP (upper window voltage) and VWN (lower window voltage). The outputs of the comparators 1801, 1803 are used to set and reset an RS latch 1805 which develops the PWM signal at its Q output. A switch 1807 controlled according to the duty cycle (D) of PWM switches a current source 1809 based on the input voltage VIN (GM·VIN) to the ripple capacitor CR in a similar manner as described above for the transconductance amplifier 101 and switch SW1. Again, PWM may be used to control the switch for controlling the source current provided to the ripple capacitor CR. A current sink 1811 draws current based on the output voltage VO (GM·VO) in similar manner for sinking current from the ripple capacitor CR. In this case, rather than adjusting the transconductance device developing the source current, a separate transconductance amplifier 1813 receives the adjust value for adjusting the amount of source current provided to the ripple capacitor CR when the switch is closed (when PWM is high). Thus, for example, the adjust value increases the source current to adjust (decrease) the on-time of the pulse width of PWM. The frequency may also be increased accordingly as previously described.

In an alternative embodiment, although not shown, the adjust value may be used to adjust the sink current to adjust (decrease) the off-time of the pulse width of PWM. The frequency may also be increased accordingly as previously described. Thus the transconductance amplifier 1813 in parallel with the current source 1809 may instead be placed in parallel with the current sink 1811.

Figure 19:
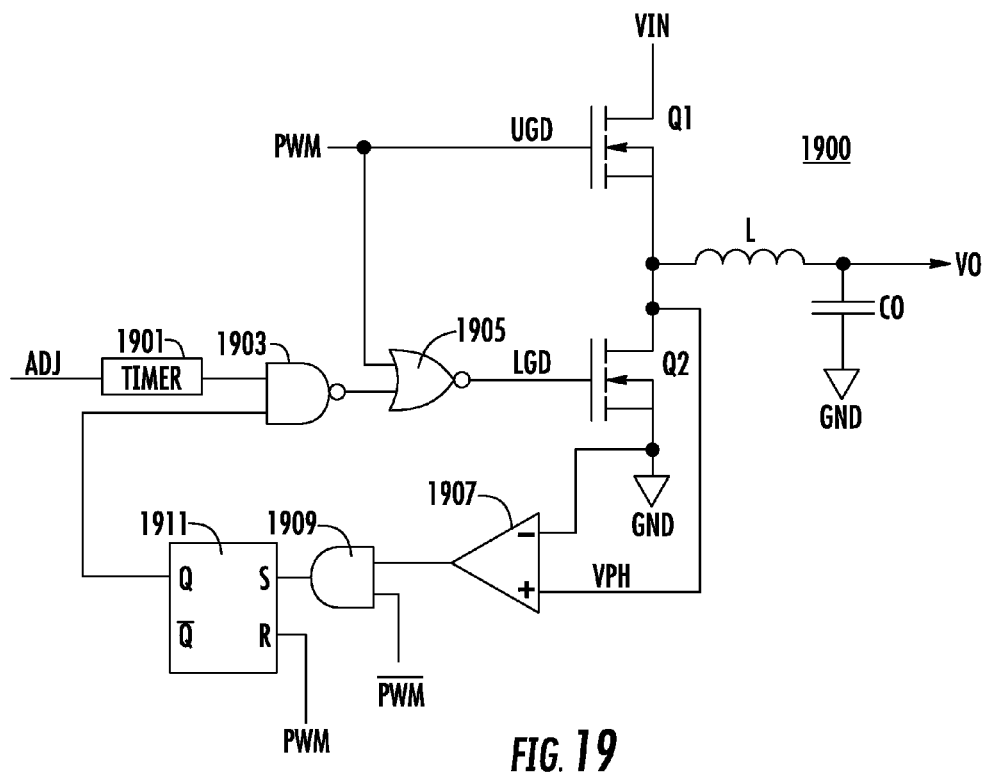
FIG. 19 is a simplified schematic diagram of a regulator according to another embodiment for adjusting the PWM off-time.

FIG. 19 is a simplified schematic diagram of a regulator 1900 according to another embodiment for adjusting the PWM off-time. The adjust value are provided to a timer 1901, having an output provided to one input of a NAND gate 1903. The output of the NAND gate 1903 is provided to one input of a NOR gate 1905, receiving PWM at its other input and asserting LGD at its output to the gate of Q2. Although PWM is shown provided directly to the gate of the upper switch Q1, PWM is usually instead provided to a driver (not shown) which develops an upper gate drive (UGD) voltage provided to the upper switch Q1 (NOR gate 1905 operates as a driver in this case). The phase node voltage VPH is provided to the non-inverting input of a comparator 1907 having its inverting input coupled to GND (or other reference voltage). The output of the comparator 1907 is provided to one input of an AND gate receiving an inverted PWM signal $\overline{\text{PWM}}$ at its other input and having its output provided to the set input of an RS latch 1911. PWM is provided to the set input of the RS latch 1911, having its Q output provided to the other input of the NAND gate 1903.

FIG. 19 illustrates the operation as adjusted by the adjust value. In this case, the timer 1901 is used to prevent the frequency of operation from falling below a predetermined minimum level during normal operation, such as to maintain the frequency at super-sonic levels (e.g., above 25 kHz). The adjust value are used to adjust one or more timing parameters of the timer 1901 to adjust PWM off-time during DCM. The timing parameter may be the timeout of the timer 1901, such as to reduce timeout to increase frequency.

Figure 20:
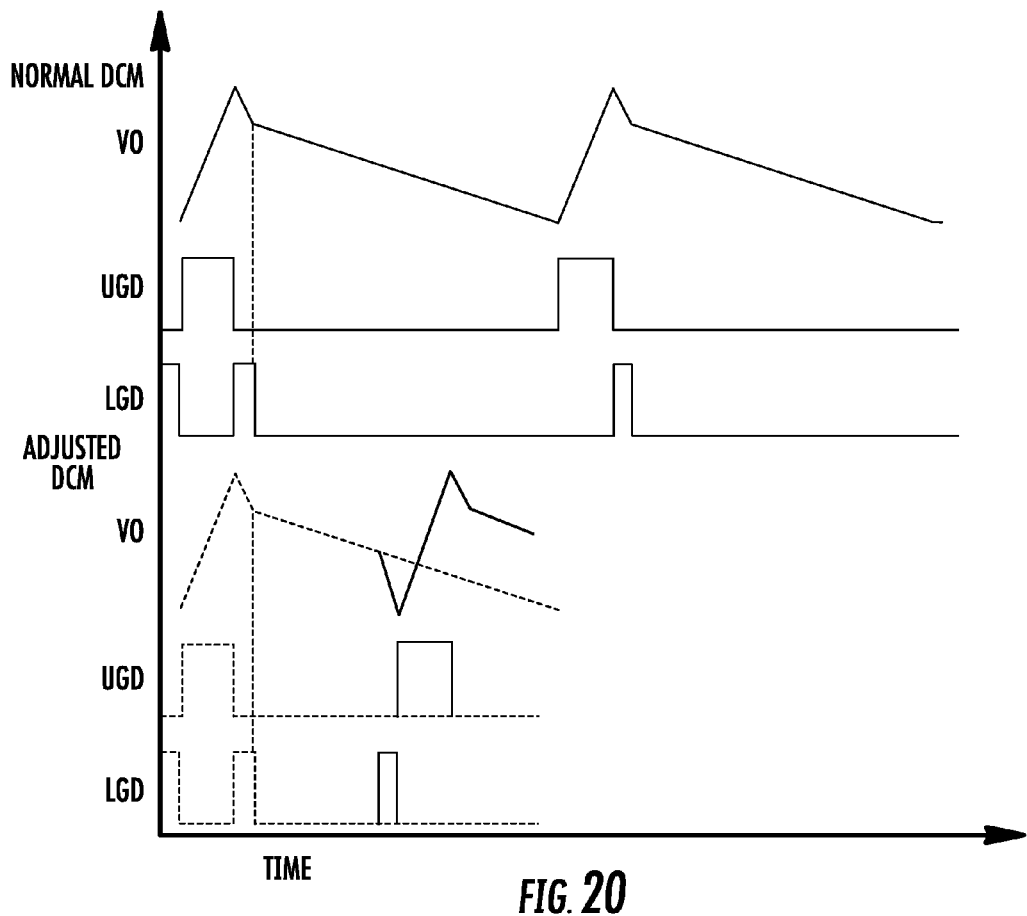
FIG. 20 is a timing diagram illustrating operation of the regulator of FIG. 19.

FIG. 20 is a timing diagram illustrating operation of the regulator 1900. VO, UGD and LGD are plotted versus time for normal DCM operation (on top) and for adjusted DCM operation (on bottom) in which the corresponding signals are aligned to illustrate the adjustment. As shown for the normal DCM operation, UGD is asserted (coincident with PWM going high) causing VO to ramp up, and then UGD is negated (coincident with PWM going low) and LGD is asserted to cause VO to ramp down. LGD is turned off early according to DCM and VO ramps down more slowly until the next cycle when UGD is asserted again in response to PWM going back high.

As shown for the adjusted DCM operation, the dashed lines are copied from the normal plots. The solid lines illustrate adjusted operation in the lower plot. In this case, the timing parameter of the timer 1901 is adjusted causing LGD to be asserted earlier than for the normal case, which accelerates ramping down of the output voltage VO. This action triggers early onset of the next PWM pulse, so that UGD is asserted earlier as compared to normal CCM operation.

Figure 21:
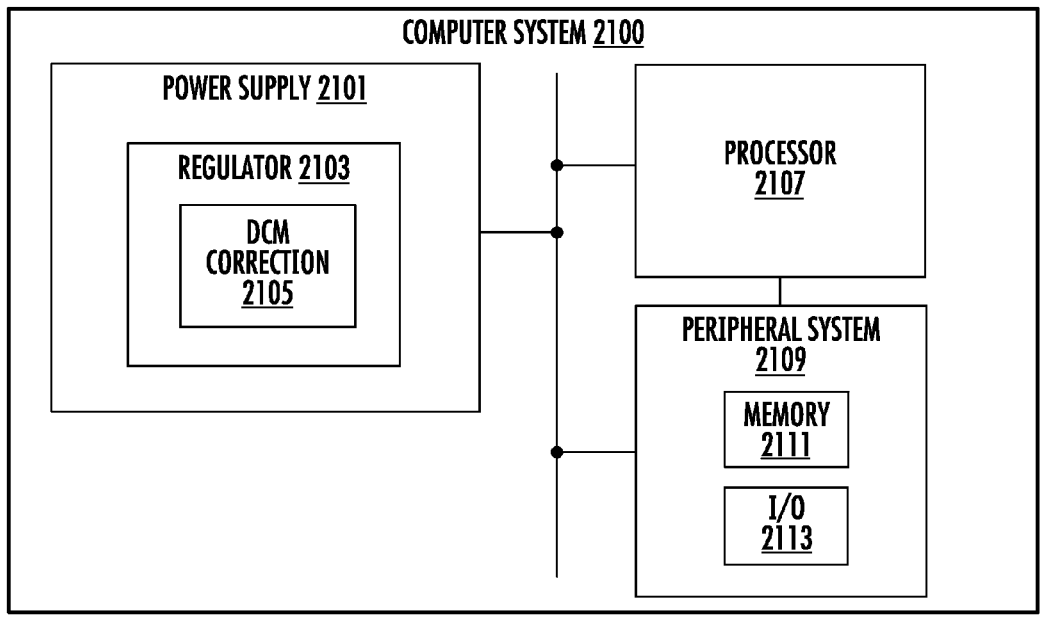
FIG. 21 is a simplified block diagram of a computer system configured with a power supply including a regulator configured with a DCM correction network according to any of the embodiments described herein or according to any other embodiment of the present invention.

FIG. 21 is a simplified block diagram of a computer system 2100 configured with a power supply 2101 including a regulator 2103 configured with a DCM correction network 2105 according to any of the embodiments described herein or according to any other embodiment of the present invention. The power supply 2101 develops the supply voltages (e.g., VO) which provides power to other system devices of the computer system 2100. In the illustrated embodiment, the computer system 2100 includes a processor 2107 and a peripheral system 2109, both coupled to receive supply voltages from the power supply 2103. In the illustrated embodiment, the peripheral system 2109 may include any combination of a system memory 2111 (e.g., including any combination of RAM and ROM type devices and memory controllers and the like), and an input/output (I/O) system 2113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the spirit and scope of the invention as defined by the following claim(s).

The invention claimed is:

1. A controller for a switch mode regulator, wherein the switch mode regulator can operate in a discontinuous conduction mode (DCM) and can reach an operating range limit that can cause regulation error when below a low load condition during DCM, the controller comprising:
   a correction network which detects the low load condition indicative of regulation error during DCM and which asserts an adjust value indicative of the low load condition;
   wherein said correction network detects said low load condition by comparing a regulation sense signal with at least one threshold value, and wherein said correction network asserts said adjust value to one of a plurality of values based on which of said at least one threshold value is met; and
   a modulator which generates a pulse control signal, which receives said adjust value and which adjusts operation of the controller accordingly by reducing a pulse width of a pulse control signal to improve regulation during DCM.

2. The controller of claim 1, wherein
said correction network measures periods between pulses of the pulse control signal and detects said low load condition when at least one period exceeds a predetermined timing threshold.

3. The controller of claim 1, further comprising:
an input receiving a current sense signal indicative of load current as said regulation sense signal; and
wherein said correction network detects said low load condition when said current sense signal falls below a predetermined current threshold.

4. The controller of claim 1, wherein said modulator develops a ramp control signal and wherein said modulator adjusts said ramp control signal based on said adjust value.

5. The controller of claim 1, wherein said modulator comprises an amplifier providing a window current for developing a window voltage and wherein said amplifier adjusts said window current based on said adjust value.

6. The controller of claim 1, wherein said modulator adjusts an on-time of at least one pulse of a pulse control signal based on said adjust value.

7. The controller of claim 1, wherein said modulator adjusts an off-time between pulses of a pulse control signal based on said adjust value.

8. The controller of claim 1, wherein said modulator comprises an amplifier having a gain which is adjusted based on said adjust value.

9. The controller of claim 1, wherein said modulator comprises an amplifier having at least one input receiving said adjust value.

10. The controller of claim 1, wherein said modulator comprises a voltage-controlled oscillator having a frequency which is adjusted by said adjust value.

11. The controller of claim 1, wherein said modulator comprises a timer having a timeout period which is adjusted by said adjust value.

12. The controller of claim 1, wherein:
said correction network comprises a timing network which compares periods between pulses of the pulse control signal with a first threshold duration and with a second threshold duration, wherein said second threshold duration is greater than said first threshold duration; and
wherein said correction network initially asserts said adjust value to a default value, wherein said correction network asserts said adjust value to a first adjust value when said second threshold duration is exceeded, wherein said correction network maintains said adjust value at said first adjust value while said first threshold duration is exceeded, and wherein said correction network asserts said adjust value to said default value whenever said first threshold duration is not exceeded.

13. The controller of claim 12, wherein said timing network compares periods between pulses of the pulse control signal with a third threshold duration which is greater than said second threshold duration, and wherein said correction network asserts said adjust value to a second adjust value when said adjust value is at said first adjust value and when said third threshold duration is exceeded.

14. The controller of claim 13, wherein said timing network compares periods between pulses of the pulse control signal with a fourth threshold duration which is greater than said first threshold duration and less than said second duration, and wherein said correction network asserts said adjust value to said first adjust value when said adjust value is at said second adjust value and when said first threshold duration is exceeded while said fourth threshold duration is not exceeded.

15. The controller of claim 1, wherein said correction network comprises:
a plurality of comparators, each comparing said regulation sense signal with a corresponding one of a plurality of different threshold values and providing a corresponding plurality of trigger signals; and
a decoder which asserts said adjust value to one of a plurality of different levels based on a number of said plurality of trigger signals which are provided.

16. The controller of claim 1, wherein said correction network comprises:
a switching period measurement network which measures periods between pulses of said pulse control signal and which outputs a current switching period value;
a memory which receives said current switching period value and which provides a previous switching period value; and
a pulse decoder which receives said current switching period value and said previous switching period value and which outputs said adjust value.

17. A method capable of improving regulation accuracy of a regulator during discontinuous conduction mode (DCM) providing an output voltage, wherein the regulator can reach an operating range limit when below a low load condition during DCM that can cause regulation error, comprising:
modulating an error signal for regulating a level of the output voltage including generating a pulse control signal;
detecting the low load condition indicative of regulation error during DCM and providing an adjust value indicative of the low load condition, wherein said detecting a low load condition comprises comparing a regulation sense signal with at least one threshold value and wherein said providing and adjust value comprises asserting the adjust value to one of a plurality of values based on which of said at least one threshold value is met; and
adjusting said modulating by reducing a pulse width of the pulse control signal during DCM based on the adjust value to reduce the regulation error.

18. The method of claim 17, wherein
said detecting the low load condition comprises comparing periods between pulses of the pulse control signal with at least one timing threshold.

19. The method of claim 17, further comprising:
receiving a current sense signal indicative of output current as said regulation sense signal; and
wherein said detecting the low load condition comprises comparing said current sense signal with at least one current threshold.

20. The method of claim 17, wherein said modulating comprises developing a ramp control signal and wherein said adjusting said modulating comprises adjusting the ramp control signal.

21. The method of claim 17, wherein said modulating comprises developing a window voltage and wherein said adjusting said modulating comprises adjusting the window voltage.

22. The method of claim 17, wherein said modulating comprises developing an oscillation signal and wherein said adjusting said modulating comprises adjusting the frequency of the oscillation signal.

23. The method of claim 17, wherein
said adjusting said modulating comprises adjusting pulse width of at least one pulse of the pulse control signal.

24. The method of claim 17, wherein:
said adjusting said modulating comprises adjusting off time between pulses of the pulse control signal.

25. The method of claim 21, wherein said adjusting said modulating comprises adjusting a gain of an amplifier used for said modulating an error signal.

26. The method of claim 17, wherein said adjusting said modulating comprises adjusting an input of an amplifier used for said modulating an error signal.

27. The method of claim 17, wherein said adjusting said modulating comprises adjusting a timeout period of a timer used for said modulation an error signal.

28. The method of claim 17, wherein said detecting the low load condition comprises comparing said regulation sense signal with a plurality of threshold values and wherein said providing and adjust value comprises asserting the adjust value to one of a plurality of values based on which of said plurality of threshold values are met.

29. A computer system, comprising:
a processor;
a peripheral system coupled to said processor, said peripheral system comprising memory; and
a switch mode regulator coupled to said processor and said peripheral system, said switch mode regulator comprising:
a switch network which converts an input voltage to an output voltage based on a pulse control signal, wherein said switch network has a continuous conduction mode (CCM) during normal operation and a discontinuous conduction mode (DCM) during low load conditions;
an error network which compares a signal indicative of said output voltage with a reference signal and which provides an error signal indicative thereof, wherein said error network can saturate causing regulation error when below a low load condition;
a modulator which receives said error signal, which develops said pulse control signal for controlling said switch network for regulating said output voltage, and which adjusts modulation operation by reducing a pulse width of said pulse control signal based on an adjust value; and
a correction network which detects said low load condition indicative of regulation error during said DCM and which asserts said adjust value to prevent saturation of said error network when said low load condition is detected, wherein said correction network detects said low load condition by comparing a regulation sense signal with at least one threshold value, and wherein said correction network asserts said adjust value to one of a plurality of values based on which of said at least one threshold value is met.

30. The computer system of claim 29, wherein said correction network measures periods between pulses of said pulse control signal and detects said low load condition when at least one period exceeds at least one predetermined timing threshold.

31. The computer system of claim 29, wherein said correction network receives a current sense signal indicative of output current and detects said low load condition when said current sense signal falls below a predetermined current threshold.

32. The computer system of claim 29, wherein said modulation adjusts one of pulse on-time of said pulse control signal, pulse off-time of said pulse control signal, and modulation frequency based on said adjust value.

33. The controller of claim 1, wherein said correction network controls said modulator to reduce pulse off time by triggering early onset of a next pulse on a pulse control signal developed by said modulator.

* * * * *